US012723879B2

(12) United States Patent
Mori

(10) Patent No.: US 12,723,879 B2
(45) Date of Patent: Sep. 1, 2026

(54) POSITION ESTIMATION APPARATUS AND VEHICLE CONTROL SYSTEM

(71) Applicant: Honda Motor Co., Ltd., Tokyo (JP)

(72) Inventor: Naoki Mori, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 103 days.

(21) Appl. No.: 18/942,599

(22) Filed: Nov. 9, 2024

(65) Prior Publication Data

US 2025/0155245 A1 May 15, 2025

(30) Foreign Application Priority Data

Nov. 15, 2023 (JP) ................................ 2023-194182

(51) Int. Cl.
*G01C 21/30* (2006.01)

(52) U.S. Cl.
CPC .................................... *G01C 21/30* (2013.01)

(58) Field of Classification Search
CPC ..................................................... G01C 21/30
See application file for complete search history.

(56) References Cited

U.S. PATENT DOCUMENTS 11,763,569 B2 * 9/2023 Hunt ..................... G06F 18/253 348/148
2011/0251768 A1 * 10/2011 Luo ........................ G06V 20/58 701/1
2021/0156698 A1 * 5/2021 Koda ..................... G09B 29/10
2022/0311932 A1 * 9/2022 Hunt ...................... G06V 20/56

FOREIGN PATENT DOCUMENTS

JP 2021056629 A 4/2021
JP 2022151680 A * 10/2022 ....... G08G 1/096725
JP 7294476 B2 * 6/2023 ........... G06F 18/253

OTHER PUBLICATIONS

Japanese Office action; Application 2023-194182; 10 pages; Aug. 19, 2025.

* cited by examiner

*Primary Examiner* — Tarek Elarabi
(74) *Attorney, Agent, or Firm* — Duft & Bornsen, PC

(57) ABSTRACT

A position estimation apparatus includes a microprocessor and a memory. The memory stores beforehand an environmental map as first map information including feature points corresponding to an external situation of a vehicle. The microprocessor is configured to perform: extracting feature points from detection data of a detector configured to detect the external situation; estimating a position of the vehicle, based on the feature points extracted from the detection data and the first map information; determining whether a reliability degree of the estimated position of the vehicle is lower than a predetermined degree; generating second map information by using the feature points extracted from the detection data, in a case where it is determines that the reliability degree is lower than the predetermined degree; and estimating the position of the vehicle, based on the feature points extracted from the detection data and the second map information.

10 Claims, 4 Drawing Sheets

POSITION ESTIMATION APPARATUS AND VEHICLE CONTROL SYSTEM

CROSS-REFERENCE TO RELATED APPLICATION

This application is based upon and claims the benefit of priority from Japanese Patent Application No. 2023-194182 filed on Nov. 15, 2023, the content of which is incorporated herein by reference.

BACKGROUND

Technical Field

The present invention relates to a position estimation apparatus and vehicle control system configured to estimate a position of a subject vehicle.

Related Art

As this type of device, a device configured to collate a feature point extracted from a captured image by a camera mounted on a terminal device such as a smartphone with a feature point map, and to estimate a current position of the terminal device has conventionally been known (for example, see JP 2021-56629 A). The device described in JP 2021-56629 A selects a feature point map corresponding to an imaging condition when a captured image is acquired from among a plurality of feature point maps corresponding to a plurality of imaging conditions defined by season, time, weather, and the like, and estimates the current position of the terminal device by using the feature point map.

However, if the feature point map is prepared for every imaging condition like the device described in JP 2021-56629 A, the storage amount of data will increase. On the other hand, if only a feature point map corresponding to a specific imaging condition is prepared in order to suppress an increase in the storage amount of data, it will be difficult to accurately estimate the position of the subject vehicle.

SUMMARY

An aspect of the present invention is a position estimation apparatus includes: a detector configured to detect an external situation of a vehicle; and a microprocessor and a memory coupled to the microprocessor. The memory stores beforehand an environmental map as first map information including feature points corresponding to the external situation. The microprocessor is configured to perform: extracting feature points from detection data of the detector, estimating a position of the vehicle, based on the feature points extracted from the detection data and the first map information stored in the memory, determining whether a reliability degree of the position of the vehicle estimated in the estimating is lower than a predetermined degree; generating second map information by using the feature points extracted from the detection data, in a case where it is determines that the reliability degree is lower than the predetermined degree; and estimating the position of the vehicle, based on the feature points extracted from the detection data and the second map information.

BRIEF DESCRIPTION OF DRAWINGS

The objects, features, and advantages of the present invention will become clearer from the following description of embodiments in relation to the attached drawings, in which.

DETAILED DESCRIPTION

An embodiment of the present invention will be described below with reference to FIGURES. A position estimation apparatus according to the embodiment of the present invention can be applied to a vehicle having a self-driving capability, that is, a self-driving vehicle. Note that a vehicle to which the position estimation apparatus according to the present embodiment is applied may be referred to as a subject vehicle to be distinguished from other vehicles. The subject vehicle may be any of an engine vehicle including an internal combustion (engine) as a traveling drive source, an electric vehicle including a traveling motor as a traveling drive source, and a hybrid vehicle including an engine and a traveling motor as a traveling drive source. The subject vehicle can travel not only in a self-drive mode in which a driving operation by a driver is unnecessary, but also in a manual drive mode by the driving operation by the driver.

Figure 1:
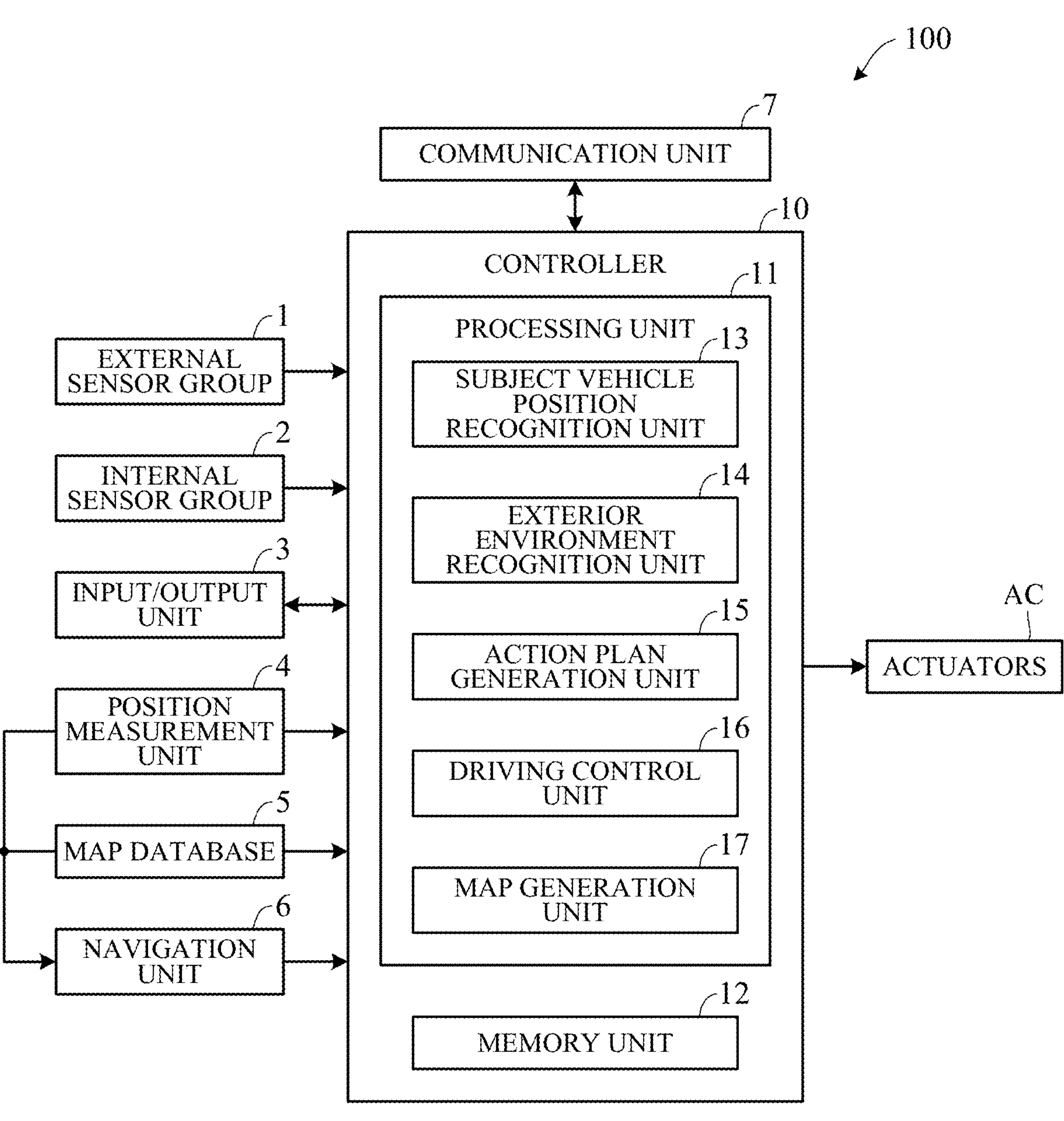
FIG. 1 is a block diagram schematically illustrating an overall configuration of a vehicle control system according to an embodiment of the present invention.

First, a schematic configuration of the subject vehicle related to self-driving will be described. FIG. 1 is a block diagram schematically illustrating an overall configuration of a vehicle control system 100 of the subject vehicle including the position estimation apparatus according to the embodiment of the present invention. As illustrated in FIG. 1, the vehicle control system 100 mainly includes a controller 10, an external sensor group 1, an internal sensor group 2, an input/output device 3, a position measurement unit 4, a map database 5, a navigation unit 6, a communication unit 7, and actuators AC each communicably connected to the controller 10.

The external sensor group 1 is a generic term for a plurality of sensors (external sensors) that detects an external situation which is peripheral information of the subject vehicle. For example, the external sensor group 1 includes a LiDAR that measures scattered light with respect to irradiation light in all directions of the subject vehicle and measures a distance from the subject vehicle to surrounding obstacles, a radar that detects other vehicles, obstacles, and the like around the subject vehicle by emitting electromagnetic waves and detecting reflected waves, a camera that is mounted on the subject vehicle, has an imaging element (image sensor) such as a charge coupled device (CCD) or a complementary metal oxide semiconductor (CMOS), and images a periphery (forward, backward, and sideward) of the subject vehicle, and the like.

The internal sensor group 2 is a generic term for a plurality of sensors (internal sensors) that detects a traveling state of the subject vehicle. For example, the internal sensor group 2 includes an inertial measurement unit (IMU) that detects rotational angular velocity around three axes, namely the vertical direction of the center of gravity of the subject vehicle, the front-rear direction (advancing direction), and the left-right direction (vehicle width direction), as well as acceleration in three axial directions. The internal sensor group 2 further includes a sensor that detects driver's driving operation in a manual drive mode, for example, operation of an accelerator pedal, operation of a brake pedal, operation of a steering wheel, and the like.

The input/output device 3 is a generic term for devices in which a command is input from a driver or information is output to the driver. For example, the input/output device 3 includes various switches to which the driver inputs various commands by operating an operation member, a microphone to which the driver inputs a command by voice, a display that provides information to the driver via a display image, a speaker that provides information to the driver by voice, and the like.

The position measurement unit (global navigation satellite system (GNSS) unit) 4 includes a position measurement sensor that receives a signal for position measurement transmitted from a position measurement satellite. The position measurement satellite is an artificial satellite such as a global positioning system (GPS) satellite or a quasi-zenith satellite. The position measurement unit 4 uses the position measurement information received by the position measurement sensor to measure a current position (latitude, longitude, and altitude) of the subject vehicle.

The map database 5 is a device that stores general map information used for the navigation unit 6, and is constituted of, for example, a hard disk or a semiconductor element. The map information includes road position information, information on a road shape (curvature or the like), and position information on intersections and branch points. Note that the map information stored in the map database 5 is different from highly accurate map information stored in a memory unit 12 of the controller 10.

The navigation unit 6 is a device that searches for a target route on a road to a destination input by a driver and provides guidance along the target route. The input of the destination and the guidance along the target route are performed via the input/output device 3. The target route is calculated on the basis of a current position of the subject vehicle measured by the position measurement unit 4 and the map information stored in the map database 5. The current position of the subject vehicle can be also measured using the detection value of the external sensor group 1, and the target route may be calculated on the basis of the current position and the highly accurate map information stored in the memory unit 12.

The communication unit 7 communicates with various servers not illustrated via a network including wireless communication networks represented by the Internet, a mobile telephone network, and the like, and acquires the map information, traveling history information, traffic information, and the like from the server periodically or at an arbitrary timing. The communication unit 7 may not only acquire the driving history information but also send the driving history information of the subject vehicle to a server via the communication unit 7. The network includes not only a public wireless communication network but also a closed communication network provided for each predetermined management region, for example, a wireless LAN, Wi-Fi (registered trademark), Bluetooth (registered trademark), and the like. The acquired map information is output to the map database 5 and the memory unit 12, and the map information is updated.

The actuators AC are traveling actuators for controlling traveling of the subject vehicle. In a case where the traveling drive source is an engine, the actuators AC include a throttle actuator that adjusts an opening (throttle opening) of a throttle valve of the engine. In a case where the traveling drive source is a traveling motor, the traveling motor is included in the actuators AC. The actuators AC also include a brake actuator that operates a braking device of the subject vehicle and a steering actuator that drives a steering device.

The controller 10 includes an electronic control unit (ECU). More specifically, the controller 10 includes a computer that has a processing unit 11 such as a central processing unit (CPU) (microprocessor), the memory unit 12 such as a read only memory (ROM) and a random access memory (RAM), and other peripheral circuits (not illustrated) such as an input/output (I/O) interface. Note that although a plurality of ECUs having different functions such as an engine control ECU, a traveling motor control ECU, and a braking device ECU can be separately provided, in FIG. 1, the controller 10 is illustrated as a set of these ECUs for convenience.

The memory unit 12 stores highly accurate detailed map information (referred to as highly accurate map information). The highly accurate map information includes road position information, information of a road shape (curvature or the like), information of a road gradient, position information of an intersection or a branch point, information of type and position of a division line of a road, information of the number of lanes, width of a lane and position information for each lane (information of a center position of a lane or a boundary line of a lane position), position information of a landmark (traffic lights, signs, buildings, etc.) as a mark on a map, and information of a road surface profile such as unevenness of a road surface. In the embodiment, the median line, lane boundary line, and roadway outside line are collectively referred to as a division line of a road. The high-precision map information stored in the memory unit 12 includes map information (referred to as external map information) that has been acquired from the outside of the subject vehicle via the communication unit 7, and a map (referred to as internal map information) created by the subject vehicle itself using detection values by the external sensor group 1 or detection values of the external sensor group 1 and the internal sensor group 2.

The external map information is, for example, information of a map that has been acquired via a cloud server (referred to as a cloud map), and the internal map information is, for example, information of a map (referred to as an environmental map) including three-dimensional point cloud data generated by mapping using a technology such as simultaneous localization and mapping (SLAM), for example. The external map information is shared among the subject vehicle and other vehicles, whereas the internal map information is map information that is exclusive to the subject vehicle (for example, map information that the subject vehicle owns by itself). For roads on which the subject vehicle has never traveled, newly constructed roads, and the like, environmental maps are created by the subject vehicle itself. Note that the internal map information may be provided for a server apparatus or other vehicles via the communication unit 7.

In addition to the above-described high-precision map information, the memory unit 12 also stores driving trajectory information of the subject vehicle, various control programs, and thresholds for use in the programs.

The processing unit 11 includes a subject vehicle position recognition unit 13, an exterior environment recognition unit 14, an action plan generation unit 15, a driving control unit 16, and a map generation unit 17 as functional configurations.

The subject vehicle position recognition unit 13 recognizes (may be referred to as estimates) the position (subject vehicle position) of the subject vehicle on a map, on the basis of the position information of the subject vehicle, obtained by the position measurement unit 4, and the map information of the map database 5. The subject vehicle position may be recognized (estimated) using the high-precision map information stored in the memory unit 12 and the peripheral information of the subject vehicle detected by the external sensor group 1, whereby the subject vehicle position can be recognized with high precision. The subject vehicle position can be also recognized by calculating movement information (movement direction, distance traveled) of the subject vehicle based on the detection values of the internal sensor group 2. Note that when the subject vehicle position can be measured by a sensor installed on the road or outside a road side, the subject vehicle position can be recognized by communicating with the sensor via the communication unit 7.

The exterior environment recognition unit 14 recognizes an external situation around the subject vehicle on the basis of the signal from the external sensor group 1 such as a LiDAR, a radar, and a camera. For example, the position, travel speed, and acceleration of a surrounding vehicle (a forward vehicle or a rearward vehicle) traveling around the subject vehicle, the position of a surrounding vehicle stopped or parked around the subject vehicle, the positions and states of other objects and the like are recognized. Other objects include signs, traffic lights, markings (road marking) such as division lines and stop lines of roads, buildings, guardrails, utility poles, signboards, pedestrians, bicycles, and the like. The states of other objects include a color of a traffic light (red, blue, yellow), the moving speed and direction of a pedestrian or a bicycle, and the like. Some of objects that are stationary among the other objects make up landmarks that indicate the position on the map, and the exterior environment recognition unit 14 also recognizes position and type of the landmarks.

The action plan generation unit 15 generates a driving path (target path) of the subject vehicle from a current point of time to a predetermined time ahead on the basis of, for example, the target route calculated by the navigation unit 6, the high-precision map information stored in the memory unit 12, the subject vehicle position recognized by the subject vehicle position recognition unit 13, and the external situation recognized by the exterior environment recognition unit 14. When there is a plurality of paths that are candidates for the target path on the target route, the action plan generation unit 15 selects, from among the plurality of paths, an optimal path that satisfies criteria such as compliance with laws and regulations and efficient and safe traveling, and sets the selected path as the target path. Then, the action plan generation unit 15 generates an action plan corresponding to the generated target path. The action plan generation unit 15 generates various action plans corresponding to overtaking traveling for overtaking a preceding vehicle, lane change traveling for changing a travel lane, following traveling for following a preceding vehicle, lane keeping traveling for keeping the lane so as not to deviate from the travel lane, deceleration traveling, or acceleration traveling. When the action plan generation unit 15 generates the target path, the action plan generation unit 15 first determines a travel mode, and generates the target path on the basis of the travel mode.

In the self-drive mode, the driving control unit 16 controls each of the actuators AC such that the subject vehicle travels along the target path generated by the action plan generation unit 15. More specifically, the driving control unit 16 calculates a requested driving force for obtaining the target acceleration for each unit time calculated by the action plan generation unit 15 in consideration of travel resistance determined by a road gradient or the like in the self-drive mode. Then, for example, the actuators AC are feedback controlled so that an actual acceleration detected by the internal sensor group 2 becomes the target acceleration. That is, the actuators AC are controlled so that the subject vehicle travels at the target vehicle speed and the target acceleration. Note that, in the manual drive mode, the driving control unit 16 controls each of the actuators AC in accordance with a travel command (steering operation or the like) from the driver acquired by the internal sensor group 2.

The map generation unit 17 generates an environmental map in the surroundings of the road on which the subject vehicle has traveled, as internal map information, by using the detection values that have been detected by the external sensor group 1 while the subject vehicle is traveling in the manual drive mode. For example, an edge indicating an outline of an object is extracted from a plurality of frames of camera images that have been acquired by the camera, based on luminance and color information for every pixel, and feature points are extracted with use of such edge information. The feature points are, for example, intersections of edges, and correspond to corners of buildings, corners of road signs, or the like. The map generation unit 17 calculates a three-dimensional position of a feature point while estimating the position and attitude of the camera so that identical feature points converge on a single point in a plurality of frames of camera images, in accordance with the algorithm of the SLAM technology. By performing this calculation processing for each of the plurality of feature points, an environmental map including the three-dimensional point cloud data is generated. Note that, instead of the camera, with use of data acquired by a radar or a LiDAR, the environmental map may be generated by extracting feature points of objects in the surroundings of the subject vehicle.

The subject vehicle position recognition unit 13 may perform the position recognition processing of the subject vehicle based on the environmental map generated by the map generation unit 17 and feature points extracted from the camera image. In addition, the subject vehicle position recognition unit 13 may perform the position recognition processing of the subject vehicle in parallel with the map generation processing by the map generation unit 17. The map generation processing and the position recognition (estimation) processing are simultaneously performed in accordance with, for example, the algorithm of the SLAM technology. The map generation unit 17 is capable of generating the environmental map not only when traveling in the manual drive mode but also when traveling in the self-drive mode. In a case where the environmental map has already been generated and stored in the memory unit 12, the map generation unit 17 may update the environmental map, based on newly extracted feature points (may be referred to as new feature points) from a newly acquired camera image.

Figure 2A:
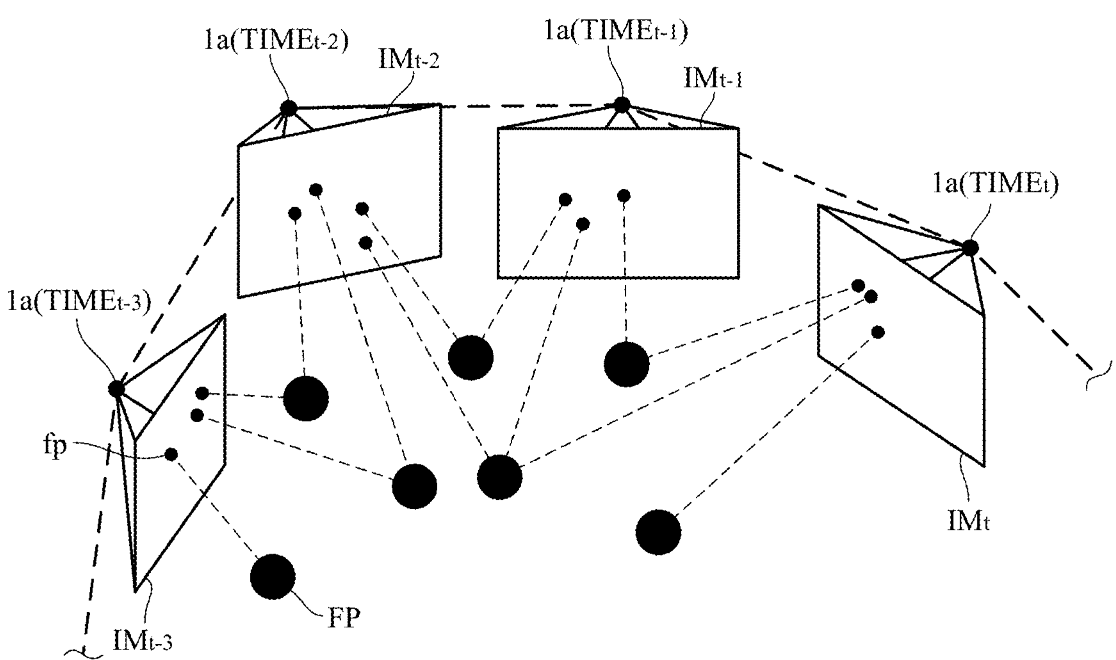
FIG. 2A is a diagram for describing position recognition processing in the subject vehicle position recognition unit in FIG. 1.
Figure 2B:
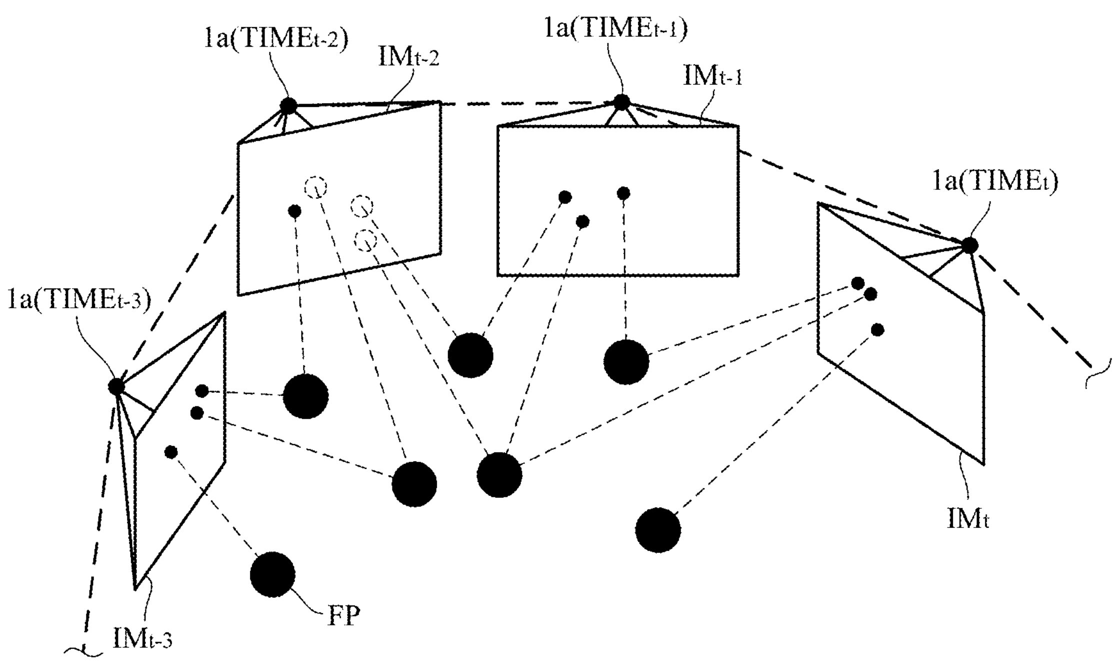
FIG. 2B is a diagram for describing the position recognition processing in the subject vehicle position recognition unit in FIG. 1.

FIGS. 2A and 2B are diagrams for describing position recognition processing in the subject vehicle position recognition unit 13. FIG. 2A illustrates a situation in which a position of the subject vehicle is recognized, based on the environmental map generated by the map generation unit 17 and the feature points that have been extracted from the camera image. In addition, FIG. 2A schematically illustrates a part (seven feature points FP) of the point cloud data included in the environmental map. Camera images $IM_{t-3}$, $IM_{t-2}$, $IM_{t-1}$, and $IM_t$ are frame image data (camera images)

that have been acquired by the camera 1$a$ at respective times t-3, t-2, t-1, and t. A black circle fp in each camera image schematically represents a feature point that has been extracted from each camera image. The subject vehicle position recognition unit 13 finds a feature point fp (hereinafter, referred to as a corresponding point), which corresponds to a feature point FP on the environmental map from the feature point cloud in the camera image, and estimates the position and the attitude of the subject vehicle (specifically, the camera 1$a$) on the environmental map. A broken line that connects the feature point FP and the feature point fp indicates that the feature point FP and the feature point fp correspond to each other. The subject vehicle position recognition unit 13 adjusts (corrects) the position and the attitude of the subject vehicle that have been estimated, based on a plurality of frames of camera images so as to improve the position estimation accuracy. For example, by using the camera images $IM_{t-3}$, $IM_{t-2}$, and $IM_{t-1}$, the subject vehicle position recognition unit 13 corrects the position and the attitude of the subject vehicle that have been estimated at the time t, based on the camera image $IM_t$. The subject vehicle position recognition unit 13 tracks the position and the attitude of the subject vehicle at each time that have been estimated in this manner, and recognizes the position of the subject vehicle that is traveling on the environmental map.

Meanwhile, in a case where the time zone when the environmental map is generated or conditions (hereinafter, referred to as environmental conditions) such as brightness around the subject vehicle, weather (climate), and the like is different from the time zone or those when the camera image is acquired, the feature point FP corresponding to the feature point fp, which has been extracted from the camera image, is not present on the environmental map in some cases, or the corresponding point of the feature point FP on the environmental map is not present in the camera image in some cases. FIG. 2B illustrates an example of a camera image acquired under an environmental condition different from that when the environmental map is generated. For example, in a case where the time zone in which the environmental map is generated is in the daytime and the time zone in which the camera image is acquired is in the nighttime, the appearance of an object such as a structure around the vehicle is different between the daytime and the nighttime. Hence, as in the camera image $IM_{t-2}$ of FIG. 2B, the feature points corresponding to the feature points FP on the environmental map are not extracted in some cases. A dashed circle in the camera image $IM_{t-2}$ in FIG. 2B schematically represents a situation in which the feature point corresponding to the feature point FP on the environmental map is not extracted from the camera image $IM_{t-2}$. In such a case, matching accuracy of feature points between the environmental map and the camera image decreases, and the position of the vehicle cannot be accurately recognized. Hence, in order to address such a problem, in the present embodiment, a position estimation device is configured as follows.

Figure 3:
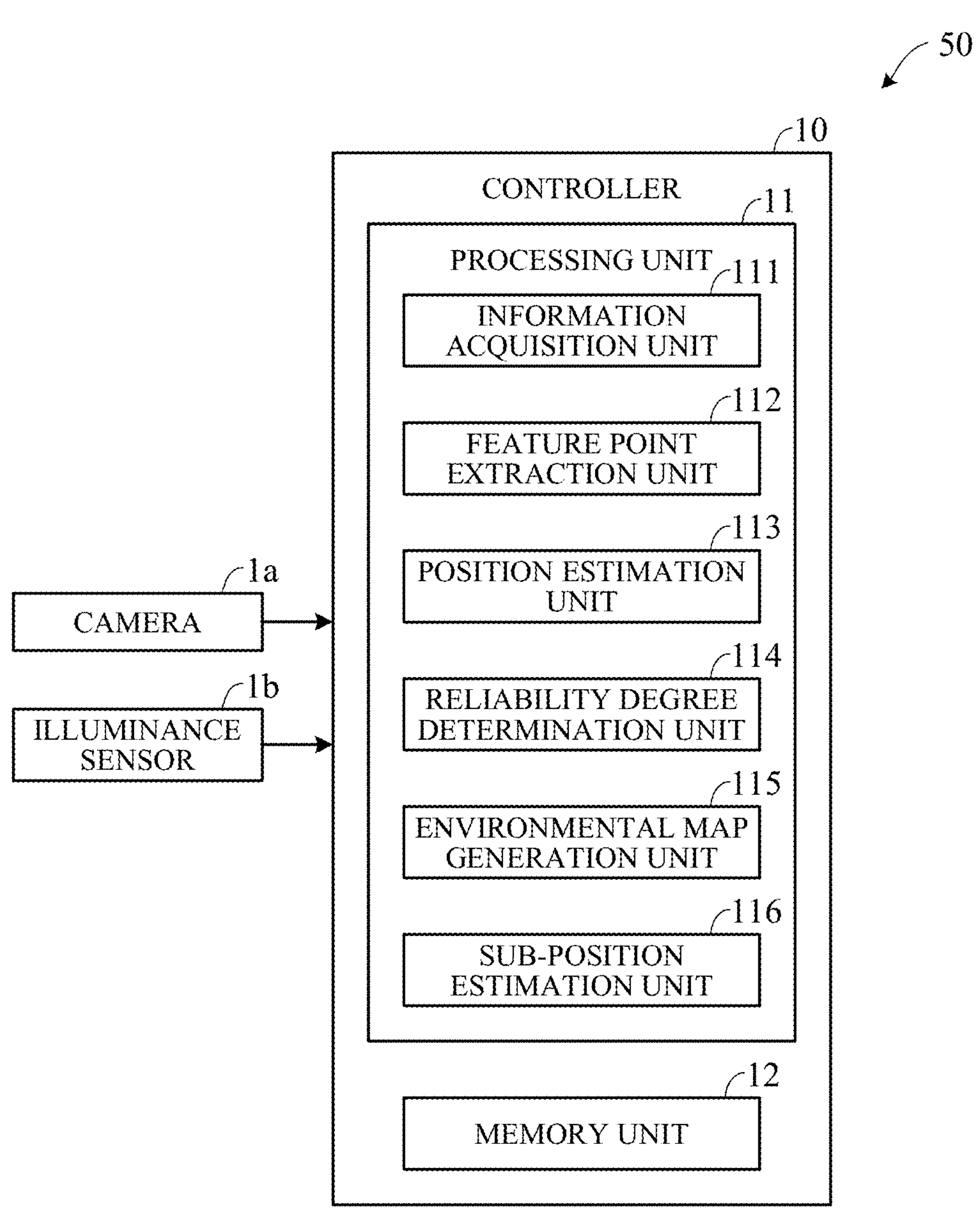
FIG. 3 is a block diagram illustrating a configuration of a substantial part of a position estimation device according to the embodiment of the present invention.

FIG. 3 is a block diagram illustrating the configuration of a substantial part of a position estimation device 50 according to the present embodiment. The position estimation device 50 constitutes a part of the vehicle control system 100 in FIG. 1. As illustrated in FIG. 3, the position estimation device 50 includes a controller 10, the camera 1$a$, and an illuminance sensor 1$b$.

The camera 1$a$ is a monocular camera including an imaging element (image sensor) such as a CCD or a CMOS, and constitutes a part of the external sensor group 1 in FIG. 1. The camera 1$a$ is attached to, for example, a predetermined position in a front part of the subject vehicle, continuously captures images of a space ahead of the subject vehicle at a predetermined frame rate, and sequentially outputs frame image data (camera images) as detection information to the controller 10. Note that the camera 1$a$ may be a stereo camera.

The illuminance sensor 1$b$ includes a light receiving element, and detects brightness (illuminance) of light incident on the light receiving element. The illuminance sensor 1$b$ is installed outside the subject vehicle (for example, on the roof) or inside the subject vehicle (on a dashboard) so as to be capable of detecting illuminance (brightness) around the subject vehicle. The illuminance sensor 1$b$ outputs a detection value (detection data) to controller 10. Note that light that passes through the windshield is somewhat attenuated by the glass. Therefore, in a case where the illuminance sensor 1$b$ is installed inside the subject vehicle, the sensor value may be corrected in consideration of such an attenuated amount.

The controller 10 includes a processing unit 11 and a memory unit 12. The processing unit 11 includes, as functional configurations, an information acquisition unit 111, a feature point extraction unit 112, a position estimation unit 113, a reliability degree determination unit 114, an environmental map generation unit 115, and a sub-position estimation unit 116. The memory unit 12 stores map information (environmental map) of roads on which the subject vehicle has traveled in the past.

The feature point extraction unit 112 and the environmental map generation unit 115 are included in, for example, the map generation unit 17 in FIG. 1. The position estimation unit 113, the reliability degree determination unit 114, and the sub-position estimation unit 116 are included in, for example, the subject vehicle position recognition unit 13 in FIG. 1.

The information acquisition unit 111 acquires information of weather, time, and surrounding brightness in the past and at the current time of a road section on which the subject vehicle has traveled. More specifically, the information acquisition unit 111 acquires weather information in the past and at the current time of the road section on which the subject vehicle has traveled from an external server (not illustrated) that provides weather information in the past and at the current time via the communication unit 7. In this timing, the information acquisition unit 111 acquires, from the external server, weather information in the past of the road section on which the subject vehicle has traveled, based on time information that is stored in the memory unit 12 in association with the environmental map. In the time information, for every feature point included in the environmental map, information indicating the time (imaged time) when the camera image, from which the feature point is extracted, was acquired by the camera 1$a$ is stored.

In addition, the information acquisition unit 111 acquires detection data of the illuminance sensor 1$b$, as current brightness information of the road section on which the subject vehicle has traveled. The information acquisition unit 111 acquires, from the memory unit 12, brightness information in the past of the road section on which the subject vehicle has traveled. The memory unit 12 stores brightness information together with time information in association with the environmental map. In the brightness information, detection data acquired by the illuminance sensor 1$b$ at the imaged time of the camera image, from which the feature point has been extracted, is recorded for every feature point included in the environmental map.

The feature point extraction unit 112 extracts a feature point from the camera image that has been acquired by the camera 1*a* while the subject vehicle is traveling on a road. The position estimation unit 113 estimates the position of the subject vehicle, based on the feature point that has been extracted by the feature point extraction unit 112 and the environmental map stored in the memory unit 12. The position estimation unit 113 estimates the current position of the subject vehicle on the road on which the subject vehicle is traveling, based on the feature point that has been extracted by the feature point extraction unit 112 from the camera image acquired by the camera 1*a* while the subject vehicle is traveling on the road, and the environmental map stored in the memory unit 12. The environmental map stored in the memory unit 12 includes a feature point cloud (three-dimensional point cloud data) that has been extracted by the feature point extraction unit 112 when the subject vehicle traveled on the road in the past.

The reliability degree determination unit 114 determines whether a reliability degree of the position of the subject vehicle estimated by the position estimation unit 113 is lower than a predetermined degree. In a case where a difference between the number of feature points that correspond to a predetermined region ahead in the advancing direction of the subject vehicle and that have been extracted by the feature point extraction unit 112 from the camera image at the current time and the number of feature points that correspond to the predetermined region among the feature points included in the environmental map stored in the memory unit 12 is equal to or larger than a predetermined threshold, the reliability degree determination unit 114 determines that the reliability degree is lower than the predetermined degree. The predetermined threshold may be changed in accordance with the number of feature points that correspond to the predetermined region included in the environmental map stored in the memory unit 12. For example, as the number of feature points that correspond to the predetermined region included in the environmental map stored in the memory unit 12 increases, the predetermined threshold may be set to increase. The predetermined region is an imaging range of the camera 1*a* at the current time.

In addition, the reliability degree determination unit 114 compares the environmental condition at the time when the environmental map stored in the memory unit 12 is generated (hereinafter, referred to as the time of map generation) with the environmental condition at the current time. The environmental condition includes at least one of the time of travel, weather, and brightness around the subject vehicle. The reliability degree determination unit 114 recognizes the time (time zone) when the subject vehicle traveled at the current position in the past, based on the time information associated with the point cloud data corresponding to the predetermined region included in the environmental map stored in the memory unit 12. In this timing, the information acquisition unit 111 acquires, from the external server, weather information corresponding to the time (time zone) when the subject vehicle traveled at the current position in the past, as the weather information in the past. Further, the information acquisition unit 111 acquires, from the memory unit 12, brightness information corresponding to the time (time zone) when the subject vehicle traveled at the current position in the past, as brightness information in the past. The comparison between the environmental conditions is made whenever a camera image is acquired by the camera 1*a*, that is, every predetermined interval based on the frame rate of the camera 1*a*. Note that the comparison between the environmental conditions may be made for every frame, or may be made whenever a predetermined number of camera images are acquired. In addition, the comparison between the environmental conditions may be made at any other timing, for example, may be made whenever the subject vehicle travels for a predetermined distance or a predetermined period of time. As a result of the comparison, in a case where there is a predetermined difference between the environmental conditions, the reliability degree determination unit 114 determines that the reliability degree of the position of the subject vehicle estimated by the position estimation unit 113 is lower than the predetermined degree.

For example, in a case where the weather at the time of map generation is sunny and the weather at the current time is bad weather (rainy, fogy, snowy, or the like) that degrades the visibility ahead of the subject vehicle, the corresponding point may not be extracted from the camera image as in the example of FIG. 2B. Further, for example, also in a case where the time of map generation is in the daytime but the current time is in a time zone or in brightness that makes it difficult to extract, from a camera image, an edge of an object included in the imaging range of the camera 1*a*, the corresponding point may not be necessarily extracted from the camera image. In the above cases, the accuracy of the position of the subject vehicle to be estimated, based on the feature points extracted from the camera image and the environmental map stored in the memory unit 12, may be lowered. Hence, in a case where there is the above difference between the environmental condition at the time of map generation and the environmental condition at the current time, the reliability degree determination unit 114 determines that the reliability degree of the position of the subject vehicle is lower than the predetermined degree. Note that the time zone in which it is difficult to extract the edge of the object is, for example, the nighttime. The brightness in which it is difficult to extract the edge of the object is, for example, illuminance equal to or smaller than a predetermined value.

Note that also in a scene of backlight (hereinafter, referred to as a backlight scene) that sunlight or light of illumination (such as a headlight of an oncoming vehicle) enters the camera 1*a* from behind an object, it is difficult to extract an edge of the object included in the imaging range of the camera 1*a* from the camera image. Therefore, also in a case where the imaging environment at the time of map generation is not in the backlight scene but the imaging environment at the current time is in the backlight scene, it may be determined that there is a predetermined difference between the environmental condition at the time of map generation and the environmental condition at the current time. Whether the imaging environment is in the backlight scene may be determined, based on the brightness of the camera image (brightness of the entire image), may be determined, based on the position and the attitude of the subject vehicle (the camera 1*a*) and the position of the sun or illumination, or may be determined in any other method.

In a case where the reliability degree determination unit 114 determines that the reliability degree is lower than the predetermined degree, the environmental map generation unit 115 starts to generate the environmental map, by using the feature points that have been extracted by the feature point extraction unit 112. The environmental map generation unit 115 continuously generates the environmental map, while the reliability degree determination unit 114 determines that the reliability degree is lower than the predetermined degree. The sub-position estimation unit 116 estimates the position of the subject vehicle on the environmental map, based on the feature points that have been extracted by the feature point extraction unit 112 and the environmental map that has been generated by the environmental map generation unit 115. The generation of the environmental map by the environmental map generation unit 115 and the estimation of the position of the subject vehicle by the sub-position estimation unit 116 are simultaneously conducted in accordance with an algorithm of the SLAM technique. Note that the environmental map (three-dimensional point cloud data) that has been generated by the environmental map generation unit 115 may be used not only for the estimation of the position of the subject vehicle by the sub-position estimation unit 116 but also for update of the environmental map stored in the memory unit 12.

The driving control unit 16 controls an actuator AC, based on the position of the subject vehicle that has been estimated by the position estimation unit 113 or the sub-position estimation unit 116. More specifically, the driving control unit 16 controls the actuator AC so that the subject vehicle travels along a target path that has been generated by the action plan generation unit 15, based on the position of the subject vehicle that has been estimated by the position estimation unit 113 or the sub-position estimation unit 116.

The driving control unit 16 controls the actuator AC, based on the position of the subject vehicle that has been estimated by the position estimation unit 113, while the reliability degree determination unit 114 determines that the reliability degree is equal to or higher than the predetermined degree. Thereafter, the reliability degree determination unit 114 determines that the reliability degree is lower than the predetermined degree, and the generation of the environmental map by the environmental map generation unit 115 and the estimation of the position of the subject vehicle by the sub-position estimation unit 116 are started. Then, the driving control unit 16 starts the control of the actuator AC based on the position of the subject vehicle that has been estimated by the sub-position estimation unit 116.

On the other hand, while the control of the actuator AC based on the position of the subject vehicle that has been estimated by the sub-position estimation unit 116 is being conducted, in a case where the reliability degree determination unit 114 determines that the reliability degree is equal to or higher than the predetermined degree, the driving control unit 16 resumes the control of the actuator AC based on the position of the subject vehicle that has been estimated by the position estimation unit 113. In this situation, the generation of the environmental map by the environmental map generation unit 115 and the estimation of the position of the subject vehicle by the sub-position estimation unit 116 are stopped.

Figure 4:
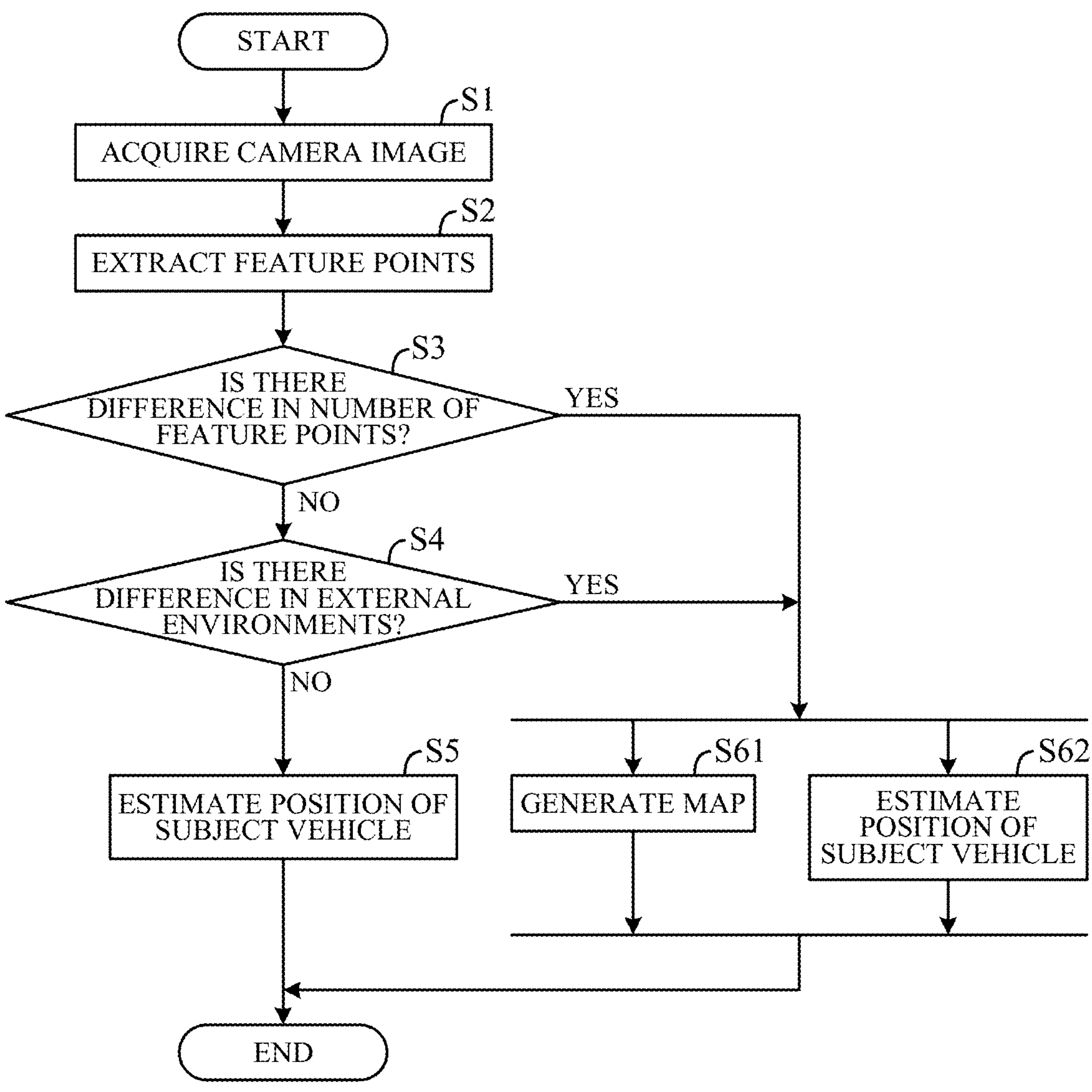
FIG. 4 is a flowchart illustrating an example of processing to be performed by a CPU of the controller in FIG. 3.

FIG. 4 is a flowchart illustrating an example of processing to be performed by the CPU of the controller 10 in FIG. 3, in accordance with a predetermined program. The processing illustrated in this flowchart is performed, for example, at a predetermined cycle while the subject vehicle is traveling in the self-drive mode.

First, in step S1, the controller 10 acquires a camera image from the camera 1*a*. In step S2, the controller 10 causes the feature point extraction unit 112 to extract feature points from the camera image. In step S3, the controller 10 determines whether there is a difference between the number of feature points extracted from the camera image in step S2 and the number of feature points of the point cloud data (hereinafter, referred to as target point cloud data) corresponding to a predetermined region (the imaging range of the camera 1*a*) included in the environmental map stored in the memory unit 12. Specifically, whether the difference in number between the feature points is equal to or larger than a predetermined threshold is determined.

In a case where a negative determination is made in step S3, whether there is a difference between the external environments is determined in step S4. Specifically, it is determined whether there is a predetermined difference between the environmental condition at the time when the target point cloud data is generated (the time of map generation) and the environmental condition at the time when the camera image is acquired in step S1, that is, the environmental condition at the current time.

In a case where a negative determination is made in step S4, the position of the subject vehicle on the environmental map is estimated in step S5, based on the feature points extracted in step S2 and the environmental map stored in the memory unit 12. On the other hand, in a case where an affirmative determination is made in step S3 or S4, an environmental map is generated in step S61 with use of the feature points extracted in step S2. In step S62, the position of the subject vehicle on the environmental map is estimated, based on the feature points extracted in step S2 and the environmental map generated in step S61. The generation of the environmental map in step S61 and the estimation of the position of the subject vehicle in step S62 are simultaneously conducted in accordance with the algorithm of the SLAM technique.

The operation of the position estimation device 50 according to the present embodiment will be summarized as follows. First, when a camera image is acquired by the camera 1*a* while the subject vehicle is traveling on a road (S1), feature points are extracted from the camera image (S2). Then, it is determined whether there is a difference between the number of feature points extracted from the camera image and the number of feature points of the target point cloud data (point cloud data corresponding to the imaging range of the camera 1*a*) included in the environmental map stored in the memory unit 12 (S3). In a case where there is no difference between the numbers of the feature points, it is further determined whether there is a difference between the external environment at the time of map generation and the external environment at the current time (S4). In a case where there is no difference between the external environments, the reliability degree of the position of the subject vehicle estimated, based on the feature points extracted from the camera image and the environmental map stored in the memory unit 12, is determined to be equal to or higher than a predetermined degree. Then, until the reliability degree is determined to be lower than the predetermined degree, the position of the subject vehicle is estimated, based on the feature points that have been extracted from the camera image and the environmental map stored in the memory unit 12 (S1 to S5).

Thereafter, the weather is getting worse, the feature point (corresponding point) corresponding to the target point cloud data cannot be extracted from the camera image. When a difference occurs between the number of feature points that have been extracted from the camera image and the number of feature points of the target point cloud data, the reliability degree is determined to be lower than the predetermined degree (S1, S3). Note that in a case where there is a difference between the external environment at the time of map generation and the external environment at the current time because the weather is getting worse, the reliability degree is determined to be lower than the predetermined degree, even though there is no difference between the number of feature points that have been extracted from the camera image and the number of feature points of the target point cloud data (S1, S3, S4). In a case where the reliability degree is determined to be lower than the predetermined degree, the estimation of the position of the subject vehicle based on the feature points that have been extracted from the camera image and the environmental map stored in the memory unit 12 is stopped, and the generation of the environmental map with use of the feature points that have been extracted from the camera image and the estimation of the position of the subject vehicle based on the environmental map are started (S61, S62). Thereafter, the weather or the like is getting better, and when the feature point (corresponding point) corresponding to the target point cloud data is accurately extracted from the camera image, the reliability degree is determined to be equal to or higher than the predetermined degree, and the estimation of the position of the subject vehicle based on the feature points that have been extracted from the camera image and the environmental map stored in the memory unit 12 is resumed (S1 to S5).

According to the above-described embodiments, the following effects are achievable.

(1) The position estimation device 50 includes: the camera 1*a* as a detector that detects an external situation of a subject vehicle; the feature point extraction unit 112, which extracts a feature point from detection data (camera image) of the camera 1*a*; the memory unit 12, which stores beforehand an environmental map as first map information including the feature point corresponding to the external situation; the position estimation unit 113, which estimates the position of the subject vehicle, based on the feature point extracted by the feature point extraction unit 112 and the environmental map stored in the memory unit 12; the reliability degree determination unit 114, which determines whether a reliability degree of the position of the subject vehicle estimated by the position estimation unit 113 is lower than a predetermined degree; the environmental map generation unit 115, which generates an environmental map as second map information by using the feature point extracted by the feature point extraction unit 112, in a case where the reliability degree determination unit 114 determines that the reliability degree is lower than the predetermined degree; and the sub-position estimation unit 116, which estimates the position of the subject vehicle, based on the feature point extracted by the feature point extraction unit 112 and the environmental map generated by the environmental map generation unit 115. The environmental map stored in the memory unit 12 is map information of a road section on which the subject vehicle has traveled in the past, and includes the feature point that has been extracted by the feature point extraction unit 112 from the camera image acquired by the camera 1*a* while the subject vehicle is traveling in the road section. The position estimation unit 113 estimates the position of the subject vehicle traveling in the road section at the current time, based on the feature point that has been extracted by the feature point extraction unit 112 from the camera image acquired by the camera 1*a* at the current time while the subject vehicle is traveling in the road section and the environmental map stored in the memory unit 12. This enables continuous estimation of the position of the subject vehicle with accuracy, even when the feature point cannot be temporarily extracted from the camera image with accuracy, because the weather is getting worse or the like, or when there is a difference between the external environment at the time of map generation and the external environment at the current time. In addition, there is no need to prepare a plurality of environmental maps corresponding to imaging conditions or the like, and thus an increase in the storage amount of data can be suppressed. Further, traffic safety and convenience can be further improved through such a driving support technology. Furthermore, it becomes possible to contribute to development of a sustainable transportation system.

(2) The reliability degree determination unit 114 determines that the reliability degree of the position of the subject vehicle estimated by the position estimation unit 113 is lower than the predetermined degree, in a case where a difference between the number of feature points corresponding to a predetermined region ahead in the advancing direction of the subject vehicle and extracted by the feature point extraction unit 112 from the camera image at the current time and the number of feature points corresponding to the predetermined region among the feature points included in the environmental map stored in the memory unit 12 is equal to or larger than a predetermined threshold. The predetermined threshold is set to increase, as the number of feature points corresponding to the predetermined region included in the environmental map stored in the memory unit 12 increases. This enables accurate recognition of a change in the external environment that has occurred between the time of map generation and the current time.

(3) The position estimation device 50 further includes: the illuminance sensor 1*b*, which detects brightness around the subject vehicle; and the information acquisition unit that acquires environmental information in the past and environmental information at the current time, including at least one of weather information, time information, and brightness information including detection data of the illuminance sensor 1*b* while the subject vehicle is traveling in the road section in the past and at the current time. The reliability degree determination unit 114 determines whether the reliability degree is lower than the predetermined degree, based on the environmental information in the past and the environmental information at the current time acquired by the information acquisition unit 111. This enables accurate estimation of the position of the subject vehicle, even in a case where the matching accuracy of the feature points between the environmental map and the camera image may decrease because the weather is getting worse, a glare phenomenon caused by the light source entering the camera, an evaporation phenomenon caused by headlight irradiation of an oncoming vehicle, or the like.

(4) The vehicle control system 100 further includes: the position estimation device 50; the actuator AC for driving; and the driving control unit 16, which controls the actuator AC, based on the position of the subject vehicle estimated by either the position estimation unit 113 or the sub-position estimation unit 116. While the driving control unit 16 is controlling the actuator AC, based on the position of the subject vehicle estimated by the position estimation unit 113, in a case where the reliability degree determination unit 114 determines that the reliability degree is lower than the predetermined degree, the driving control unit 16 stops controlling the actuator AC based on the position of the subject vehicle estimated by the position estimation unit 113, and starts to control the actuator AC based on the position of the subject vehicle estimated by the sub-position estimation unit 116. This enables the subject vehicle to travel satisfactorily in the self-drive mode. In addition, while the driving control unit 16 is controlling the actuator AC, based on the position of the subject vehicle estimated by the sub-position estimation unit 116, in a case where the reliability degree determination unit 114 determines that the reliability degree is equal to or higher than the predetermined degree, the driving control unit 16 stops controlling the actuator AC based on the position of the subject vehicle estimated by the sub-position estimation unit 116, and resumes to control the actuator AC based on the position of the subject vehicle estimated by the position estimation unit 113. This enables the subject vehicle to travel satisfactorily in the self-drive mode.

The above embodiments can be modified in various manners. Hereinafter, modifications will be described. In the above embodiment, in the case where the reliability degree determination unit 114 determines that the reliability degree is lower than the predetermined degree while the subject vehicle is traveling on the road, the controller 10 stops the estimation of the position of the subject vehicle by the position estimation unit 113, and starts the generation of the environmental map by the environmental map generation unit 115 and the estimation of the position of the subject vehicle by the sub-position estimation unit 116. However, in a case where the number of times that the reliability degree determination unit 114 has continuously determined that the reliability degree is lower than the predetermined degree exceeds a predetermined number, the controller 10 may output a stop instruction to stop the estimation of the position of the subject vehicle to the position estimation unit 113 as a first estimation unit and the sub-position estimation unit 116 as a second estimation unit. In this manner, in a case where the position of the subject vehicle is continuously lost, the controller 10 as a stop control unit interrupts the estimation of the position of the subject vehicle, so that the processing load of the position estimation device 50 can be reduced. Note that the controller 10 may output the stop instruction to the position estimation unit 113 and the sub-position estimation unit 116, in a case where the cumulative number of times that the reliability degree determination unit 114 has determined that the reliability degree is lower than the predetermined degree exceeds the predetermined number.

Note that the stop control unit may output the stop instruction to the position estimation unit 113 and the sub-position estimation unit 116, based on the traveling state of the subject vehicle. In this case, the controller 10 also functions as a state acquisition unit that acquires vehicle state information indicating the state of the subject vehicle. The stop control unit determines whether the subject vehicle is capable of continuously traveling, based on the state of the vehicle indicated by the vehicle state information acquired by the state acquisition unit. Upon determination that the subject vehicle is incapable of continuously traveling, the stop control unit outputs the stop instruction to the position estimation unit 113 and the sub-position estimation unit 116. The vehicle state information includes information indicating presence or absence of a puncture of a wheel (tire), acceleration information indicating the degree of shaking (shaking in the vertical direction or the lateral direction) of the vehicle body, and the like. For example, upon determination that the wheel is punctured, based on the vehicle state information, the stop control unit determines that the subject vehicle is incapable of continuously traveling. In addition, in a case where the acceleration in the vertical direction or the horizontal direction of the vehicle body indicated by the vehicle state information (acceleration information) is equal to or larger than a predetermined value, the road surface condition is determined to be getting worse, and the subject vehicle is determined to be incapable of continuously traveling.

Note that depending on the worse degree on the road surface condition, the subject vehicle is capable of continuously traveling, in some cases. However, even though the subject vehicle is capable of continuously traveling, if the road surface condition is getting worse, the position and the attitude of the camera 1*a* will change due to the shake of the vehicle body, and thus the feature point (corresponding point) corresponding to the target point cloud data may not be extracted from the camera image. Hence, the road surface condition of the road on which the subject vehicle is traveling may be included in the environmental condition. In this case, in a case where the road surface condition at the current time is getting worse and is different from the road surface condition at the time of map generation, it is determined that there is a difference between the environmental condition at the time of map generation and the environmental condition at the current time in the determination of step S4.

In addition, in the above embodiment, as in the example of FIG. 2B, in a case where there is a possibility that the feature point corresponding to the feature point included in the environmental map stored in the memory unit 12 is not extracted from the camera image, the reliability degree determination unit 114 determines that the reliability degree of the position of the subject vehicle estimated by the position estimation unit 113 is lower than the predetermined degree. However, in a case where it is a bad weather such as rainy at the time of map generation but it is sunny at the current time, or in a case where the time of map generation is in the nighttime and the current time is in the daytime, the feature point corresponding to the feature point extracted from the camera image may not be present in the environmental map stored in the memory unit 12. In such a case, the accuracy of the position of the subject vehicle estimated by the position estimation unit 113 may be lowered. Therefore, also in such a case, it may be determined that there is a predetermined difference between the environmental condition at the time of map generation and the environmental condition at the current time, and the reliability degree of the position of the subject vehicle estimated by the position estimation unit 113 may be determined to be lower than the predetermined degree.

In the above embodiment, it is determined whether there is a difference between the number of feature points extracted from the camera image and the number of feature points of the target point cloud data included in the environmental map stored in the memory unit 12 (S3), and then it is determined whether there is a difference between the external environment at the time of map generation and the external environment at the current time (S4). However, after the determination in step S4 is made, the determination in step S3 may be made. In the above embodiment, an example has been described in which the information indicating the imaged time of the camera image from which the feature point is extracted is recorded in the time information for every feature point included in the environmental map. However, whenever the subject vehicle travels for a predetermined distance or a predetermined time, the imaged time of the camera image acquired at that time may be recorded in the time information. In addition, in the above embodiment, an example has been described in which the detection data acquired by the illuminance sensor 1*b* at the imaged time of the camera image from which the feature point is extracted is recorded in the brightness information for every feature point included in the environmental map. However, similarly to the time information, whenever the subject vehicle travels for a predetermined distance or a predetermined time, the detection data acquired by the illuminance sensor 1*b* at that time may be recorded in the brightness information.

Further, in the above embodiment, the camera 1*a* as the first detector detects the external situation of the subject vehicle. However, the first detector may be other than the camera, and may be a radar or a LiDAR. In the above embodiment, the illuminance sensor 1*b* as the second detector detects the brightness around the subject vehicle. However, the camera 1*a* as the second detector may detect the brightness around the subject vehicle, based on the camera image.

Furthermore, in the above embodiment, the position estimation device 50 is applied to a self-driving vehicle, but the position estimation device 50 is also applicable to a vehicle other than the self-driving vehicle. For example, the position estimation device 50 is also applicable to a manual driving vehicle including advanced driver-assistance systems (ADAS).

The above embodiment can be combined as desired with one or more of the above modifications. The modifications can also be combined with one another.

According to the present invention, an increase in data memory amount is suppressed, and the position of the subject vehicle is accurately estimated.

Above, while the present invention has been described with reference to the preferred embodiments thereof, it will be understood, by those skilled in the art, that various changes and modifications may be made thereto without departing from the scope of the appended claims.

What is claimed is:

1. A position estimation apparatus comprising:

a detector configured to detect an external situation of a vehicle;

an actuator for driving the vehicle; and a microprocessor and a memory coupled to the microprocessor, wherein the memory stores beforehand an environmental map as first map information including feature points corresponding to the external situation, and the microprocessor is configured to perform:

extracting feature points from detection data of the detector, estimating a position of the vehicle, based on the feature points extracted from the detection data and the first map information stored in the memory, determining whether a reliability degree of the position of the vehicle is lower than a predetermined degree, wherein the microprocessor is configured to perform the determining including determining that the reliability degree is lower than the predetermined degree, in a case where a difference between a number of feature points extracted from the detection data at a current time and corresponding to a predetermined region ahead in an advancing direction of the vehicle and a number of feature points corresponding to the predetermined region among the feature points included in the first map information stored in the memory is equal to or larger than a predetermined threshold;

generating second map information by using the feature points extracted from the detection data, in a case where it is determined that the reliability degree is lower than the predetermined degree;

estimating the position of the vehicle, based on the feature points extracted from the detection data and the second map information; and controlling the actuator, based on the position of the vehicle estimated based on the first map information and the second map information.

2. The position estimation apparatus according to claim 1, wherein the first map information is map information of a road section on which the vehicle has traveled previously, and includes the feature points extracted from the detection data acquired by the detector while the vehicle is traveling in the road section, and the microprocessor is configured to perform estimating the position of the vehicle traveling in the road section at the current time, based on the feature points extracted from the detection data at the current time acquired by the detector while the vehicle is traveling in the road section and the first map information.

3. The position estimation apparatus according to claim 1, wherein the predetermined threshold is set to increase as the number of the feature points corresponding to the predetermined region included in the first map information increases.

4. The position estimation apparatus according to claim 2, wherein the detector is a first detector, the position estimation apparatus further comprises a second sensor configured to detect brightness around the vehicle, the microprocessor is configured to further perform acquiring environmental information at a prior time and environmental information at the current time, including at least one of weather information, time information, and brightness information including detection data of the second sensor while the vehicle is traveling in the road section at the prior time and at the current time, the microprocessor is configured to perform the determining including determining whether the reliability degree is lower than the predetermined degree, based on the environmental information at the prior time and the environmental information at the current time.

5. The position estimation apparatus according to claim 4, wherein the microprocessor is configured to perform the determining including determining that the reliability degree is lower than the predetermined degree, in a case where there is a predetermined difference between an environmental condition indicated by the environmental information at the prior time and an environmental condition indicated by the environmental information at the current time, and the environmental condition includes at least one of a time, weather, and brightness around the vehicle when the vehicle travels in the road section.

6. The position estimation apparatus according to claim 2, wherein the microprocessor is configured to further perform in a case where a number of times that the reliability degree is determined to be lower than the predetermined degree exceeds a predetermined number, stopping the estimating the position of the vehicle based on the first map information and the estimating the position of the vehicle based on the second map information.

7. The position estimation apparatus according to claim 1, wherein the microprocessor is configured to further perform acquiring vehicle state information indicating a state of the vehicle, and stopping the estimating the position of the vehicle based on the first map information and the estimating the position of the vehicle based on the second map information, based on the state of the vehicle indicated by the vehicle state information.

8. The position estimation apparatus according to claim 7, wherein the microprocessor is configured to perform the stopping including determining whether the vehicle is capable of continuously traveling, based on the state of the vehicle indicated by the vehicle state information, and upon determining that the vehicle is incapable of continuously traveling, stopping the estimating the position of the vehicle based on the first map information and the estimating the position of the vehicle based on the second map information.

9. The position estimation apparatus according to claim 1, wherein the microprocessor is configured to perform the controlling including, in a case where the reliability degree is determined to be lower than the predetermined degree while controlling the actuator based on the position of the vehicle estimated based on the first map information, stopping controlling the actuator based on the position of the vehicle estimated based on the first map information, and starting to control the actuator based on the position of the vehicle estimated based on the second map information.

10. The position estimation apparatus according to claim 9, wherein the microprocessor is configured to perform the controlling including, in a case where the reliability degree is determined to be lower than the predetermined degree while controlling the actuator based on the position of the vehicle estimated based on the second map information, stopping controlling the actuator based on the position of the vehicle estimated based on the second map information, and resuming to control the actuator based on the position of the vehicle estimated based on the first map information.

* * * * *